United States Patent [19]

Strasser

[11] Patent Number: 4,829,955
[45] Date of Patent: May 16, 1989

[54] PISTON CYLINDER KIT FOR INTERNAL COMBUSTION ENGINES

[75] Inventor: Erwin Strasser, Heilbronn, Fed. Rep. of Germany

[73] Assignee: Kolbenschmidt Aktiengesellschaft, Neckarsulm, Fed. Rep. of Germany

[21] Appl. No.: 195,472

[22] Filed: May 17, 1988

Related U.S. Application Data

[63] Continuation of Ser. No. 905,809, Sep. 10, 1986, abandoned.

[30] Foreign Application Priority Data

Sep. 11, 1985 [DE] Fed. Rep. of Germany ....... 3532308

[51] Int. Cl.[4] .............................................. F02F 1/20
[52] U.S. Cl. .......................... 123/193 CP; 123/193 C
[58] Field of Search ......... 123/193 C, 193 CP, 173 R, 123/41.83, 41.84; 92/153, 162 R, 169

[56] References Cited

U.S. PATENT DOCUMENTS

| 2,085,976 | 7/1937 | Heintz | 123/193 C |
| 3,781,022 | 12/1973 | Kumabe et al. | 92/169 |
| 3,808,955 | 5/1974 | Hamada et al. | 92/169 |

FOREIGN PATENT DOCUMENTS

| 2446870 | 1/1978 | Fed. Rep. of Germany . | |
| 3029215 | 3/1982 | Fed. Rep. of Germany ... | 123/193 C |
| 0003463 | 6/1983 | Japan | 123/193 C |

*Primary Examiner*—Willis R. Wolfe
*Assistant Examiner*—M. Macy
*Attorney, Agent, or Firm*—Sprung Horn Kramer & Woods

[57] ABSTRACT

A piston-cylinder kit for internal combustion engines is designed for a top land clearance of 0.3 to 1.5% of the diameter of the piston. The sliding surface of the cylinder has adjacent to the combustion chamber a profiled marginal portion formed with at least one peripherally extending flute. In order to facilitate the installation of the piston the crests of said profiled portion are flush with the remaining portion of said sliding surface.

6 Claims, 1 Drawing Sheet

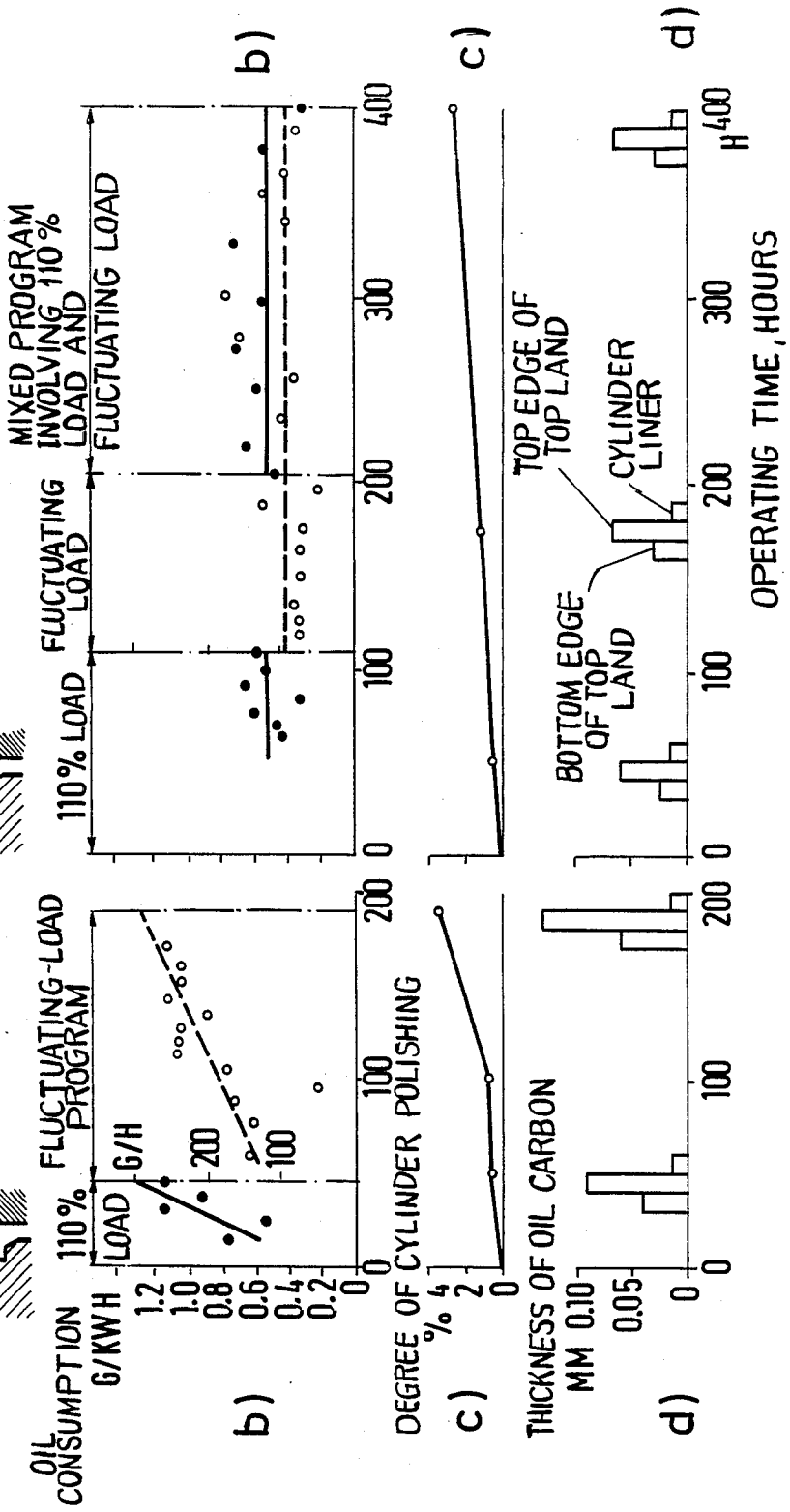

PISTON CYLINDER KIT FOR INTERNAL COMBUSTION ENGINES

This application is a continuation of application Ser. No. 905,809, filed 9/10/86, now abandoned.

BACKGROUND OF THE INVENTION

This invention relates to a piston-cylinder kit for internal combustion engines, particularly for diesel engines, which kit is designed for a top land clearance of 0.3 to 1.5%, preferably of 0.4 to 1.0%, of the piston diameter, and in which the sliding surface of the cylinder has, adjacent to the combustion chamber, a peripherally extending profiled marginal portion.

For an economical operation, an internal combustion engine should have a low fuel consumption and also a low oil consumption although the latter is only a fractional part of one percent of the fuel consumption. An increase of the oil consumption will not only reduce the economy but will also result in an undesired deposition of carbon in the combustion chamber and on the piston and in the valves and this may result in considerable consequential damages. A high oil consumption will also increase the emission of pollutants into the environment. On the other hand an excessive decrease of the oil consumption may adversely affect the operation of the internal combustion engine by resulting in an excessive wear or in a seizing of the piston. Because the oil consumption of internal combustion engines, particularly of diesel engines, should not be in excess of 0.5 g/kWh, considerable efforts are made at present to properly design and match the piston and to provide an optimum design for the piston rings and for the sliding surface of the cylinder. In that connection a special problem is presented due to the so-called polishing of the cylinder because this results in an increase of the oil consumption with the operating time of the piston and an increase of the danger of a seizing of the piston after a long operating time.

The polishing of the cylinder is effected by hard oil carbon which has been deposited on the top land of the piston during the operation of the engine and which during the longitudinal and transverse motion of the piston smoothens the honed profile formed on the sliding surface of the cylinder. In that case the lubricating oil can no longer accumulate in the scores which have been honed into the sliding surface of the cylinder having a depth of 2 to 10 micrometers, but is displaced from that sliding surface into the combustion chamber and is burnt therein. This results in a deficiency of oil, so that the wear of the piston rings and the formation of scores therein will be increased. Besides, small cracks will be formed in the sliding surface of the cylinder where it has been polished and the piston rings cannot closely fit the sliding surface of the cylinder at said cracks so that the scraping action of the piston rings is distinctly reduced and the oil consumption is increased.

From SAE Paper No. 845,010 it is known that the polishing of the sliding surface of the cylinder will be reduced or eliminated if the clearance at the top land amounts to 1.5 to 2% of the piston diameter. But that advantage cannot be afforded unless a higher temperature of the piston is tolerated. For instance, in a diesel engine the temperature will be higher by 30° to 50° C. at the rim of the combustion chamber recess and by 20° to 30° C. at the first piston ring or at the first piston ring groove. Besides, the fuel consumption will increase by an order of 2% and pollutants will be emitted at a higher rate. Whereas the increase of the piston temperature can reasonably be offset by an effective cooling of the piston and the increase of the fuel consumption and of the pollutant content of the exhaust gas can reasonably be offset by a decrease of the axial height of the top land from the usual height of 15 to 18% of the piston diameter to a height of 8 to 10% of said diameter, the results which can thus be produced are not satisfactory in view of the requirements to be met by modern internal combustion engines.

For this reason it has been proposed to subject the cylinders of diesel engines in a marginal portion which is adjacent to the combustion chamber to a non-cutting shaping so as to form said marginal portion with such a profiled shape that the building up of a layer of hard oil carbon on the top land can be prevented or kept within such narrow limits that there will be no excessive increase of the oil consumption and of the emission of pollutants in the course of the operation of the internal combustion chamber. By the measure stated above the hard oil carbon which has deposited on the top land will continually be removed by the piston as it continually engages and clears the peripherally extending, profiled upper portion of the sliding surface of the cylinder so that the polishing of the cylinder will be restricted to a permissible extent. But in such a cylinder the crests of the profile obtained by the non-cutting shaping protrude beyond the main portion of the sliding surface of the cylinder by about 0.2 mm so that the piston must be inserted into the cylinder when the latter has not yet been installed. Another disadvantage of that proposal resides in that the accuracy of the profile thus obtained is reproducible only with relatively large tolerances.

SUMMARY OF THE INVENTION

It is an object of the invention to provide a piston-cylinder kit which is of the kind described first hereinbefore and which is so designed that the piston can be inserted into the cylinder in the usual manner and that the desirable properties regarding a minimum consumption of oil, a minimum consumption of fuel, and an emission of pollutants at a low rate will not be adversely affected.

That object is accomplished in accordance with the invention in that the sliding surface of the cylinder has, adjacent to the combustion chamber, a machined marginal portion having periperally extending crests which are flush with the remaining portion of said sliding surface. A piston can be inserted into the bore of such cylinder when the latter has been installed in the engine.

In accordance with a preferred feature of the invention the profiled marginal portion of the sliding surface of the cylinder has at least one flute, which is semicircular, arcuate, trapezoidal, acute-angled, has the shape of an isosceles triangle, an obtuse-angled sawtooth shape or a similar shape and may constitute a helical flute.

In accordance with a preferred feature of the invention, the flutes of the profiled portion have a depth amounting to up to 50% of the wall thickness of the cylinder, preferably 0.5 to 10% of said wall thickness, and the flutes of said profiled portion have a pitch amounting to up to 50% and preferably 3 to 6% of the axial height of the top land.

The profiled portion of the sliding surface of the cylinder has at least in part of its peripheral extent an axial height which is equal to the axial height of the top land.

The invention is illustrated in the drawing and will be explained hereinafter in more detail and by way of example.

BRIEF DESCRIPTION OF THE DRAWINGS

FIG. 1a shows a portion of a conventional piston-cylinder kit.

FIGS. 1b–d shows the performance of the kit of FIG. 1a.

FIG. 2a shows a portion of a piston-cylinder kit according to the invention.

FIGS. 2b–d shows the performance of the kit of FIG. 2a.

DETAILED DESCRIPTION OF THE INVENTION

FIG. 1a illustrates a first experiment, in which a supercharged diesel engine was provided with a diesel piston 1 having a small top land clearance 2 amounting to 0.6% of the piston diameter. That piston was inserted into a cylinder 3, which was 120 mm in inside diameter and had been machined in the usual manner. The results of the test are illustrated in FIG. 1b, from which it is apparent that the oil consumption tends to increase with time when the engine is operated under a constant load of 110% of the rated load and under a fluctuating load. A layer of oil carbon builds up to a relatively large thickness on the top land 4 at its top and bottom edges, as is apparent from FIG. 1d. Particularly under a fluctuating load said layer of oil carbon will effect an excessive polishing of the cylinder, as is apparent from FIG. 1c, so that the measurement was discontinued after 200 hours.

In a second test illustrated in FIG. 2a, a diesel piston 5 was inserted in a diesel engine into a cylinder 7, which was 120 mm in inside diameter. The top land clearance 6 amounted to 6% of the piston diameter. In a marginal portion adjacent to the combustion chamber, the inside surface of that cylinder had been formed by machining with a profile, which included flutes 8 having the shape of an isosceles triangle.

It is apparent from FIG. 2d that the provision of the profiled portion 8 on the sliding surface of the cylinder results in a substantial decrease of the thickness of the layer of oil carbon formed on the top land 9 at its top and bottom edges and that said thickness remains constant during the life of the engine. As a result, the cylinder is polished at a permissible lower rate, as is apparent from FIG. 2c. It is apparent from FIG. 2b that during an operation of the engine under a constant load of 110% of the rated load and under a fluctuating load and during an operation involving constant and fluctuating loads the oil consumption remained on a relatively low level of about 0.6 g/kWh under a load of 110% of the rated load and of 140 g/h under a fluctuating load. These results remained constant throughout the duration of the test. As substantial changes in dependence on the operating time were not detected, the test was discontinued after 400 hours.

What is claimed is:

1. In a piston-cylinder kit for internal combustion engines, having a cylinder and a piston with a top edge, piston rings and a top land extending axially from the top edge to above the piston rings, and a top land clearance of 0.3 to 1.5% of the piston diameter, the improvement wherein the cylinder has a smooth sliding surface with a profiled portion only at an upper marginal portion of the cylinder opposite the top land of the piston in its upper dead-center position and wherein the profiled portion has crests flush with the remaining smooth portion of the sliding surface of the cylinder and the profiled portion of the sliding surface of the cylinder has at least in part of its peripheral extent an axial height which is equal to the axial height of the top land.

2. The piston-cylinder kit according to claim 1, wherein the profiled portion of the sliding surface of the cylinder has at least one flute, which is one of the group consisting of semicircular, arcuate, trapezoidal, acute-angled, has the shape of an isosceles triangle, and an obtuse-angled sawtooth shape.

3. The piston-cylinder kit according to claim 2, wherein each flute of the profiled portion has a depth amounting up to 50% of the wall thickness of the cylinder.

4. The piston-cylinder kit according to claim 2, wherein each flute of said profiled portion has a pitch amounting to up to 50% of the axial height of the top land.

5. The piston-cylinder kit according to claim 1, wherein the profiled portion comprises a helical flue.

6. The piston-cylinder kit according to claim 2, wherein each flute has a depth amounting to 0.5 to 10% of the wall thickness of the cylinder and a pitch amounting to 3 to 6% of the axial height of the top land.

* * * * *